United States Patent [19]

Ono

[11] Patent Number: 5,396,970
[45] Date of Patent: Mar. 14, 1995

[54] ELECTROMOTIVE SCOOTER

[75] Inventor: Masao Ono, Yokohama, Japan

[73] Assignee: Tokyo R&D Co., Ltd., Tokyo, Japan

[21] Appl. No.: 131,772

[22] Filed: Oct. 4, 1993

[30] Foreign Application Priority Data

Oct. 9, 1992 [JP] Japan .................................. 4-271479
Oct. 9, 1992 [JP] Japan .................................. 4-271482

[51] Int. Cl.⁶ .......................... B62K 11/00; B60L 3/04; B60L 15/04
[52] U.S. Cl. ...................................... 180/220; 318/139
[58] Field of Search ..................... 180/220, 65.1, 65.3, 180/65.8, 69.6, 65.2; 318/139; 361/78, 86, 90, 91, 92

[56] References Cited

U.S. PATENT DOCUMENTS

| | | | |
|---|---|---|---|
| 3,837,419 | 9/1974 | Nakamura | 318/139 X |
| 3,842,287 | 10/1974 | Nakamura | 318/139 X |
| 3,971,454 | 7/1976 | Waterbury | 180/65.8 |
| 4,218,717 | 8/1980 | Shuster | 361/92 X |
| 4,413,698 | 11/1983 | Conrad et al. | 180/65.1 X |
| 4,438,342 | 3/1984 | Kenyon | 180/65.2 |
| 5,166,584 | 11/1992 | Fukino et al. | 318/139 |
| 5,207,288 | 5/1993 | Ono | 180/220 |

FOREIGN PATENT DOCUMENTS

| | | | |
|---|---|---|---|
| 4-362486 | 12/1992 | Japan | 180/220 |
| 5-139365 | 6/1993 | Japan | 180/220 |

OTHER PUBLICATIONS

P. Campbell, An Electric Wheel Motor Unit Applied to Two Wheeled Vehicles, University of Cambridge, UK pp. 57–62.

Primary Examiner—Margaret A. Focarino
Assistant Examiner—F. Zeender
Attorney, Agent, or Firm—Smith-Hill and Bedell

[57] ABSTRACT

For an electromotive scooter which gets its driving force from an electric motor driven by batteries mounted thereon, and which has a power source unit for an electromotive scooter which supplies power of nominal value of 48V to the electric motor that requires high voltage to exert high driving performance and also supplies power of nominal value of 12V via an auxiliary power source to the other electric devices in such a manner that even in a case of large fluctuation of voltage in the main power source, a stable power is assured for the electric devices, a control unit, for example, making it possible to employ as these devices those products for common use on the market. Also, the electromotive scooter provides a warning device which, by means of a pilot lamp that gives a visual signal and a warning sound that gives an acoustic signal as an equivalence of the sensation of idling of inner combustion engines, tells or warns the rider or nearby people when the switch for the electric motor is on and the vehicle is ready to run.

6 Claims, 2 Drawing Sheets

ELECTROMOTIVE SCOOTER

BACKGROUND OF THE INVENTION

This invention relates to an electromotive scooter which gets its driving force from an electric motor driven by batteries mounted thereon, or more particularly to a power source unit for an electromotive scooter and a warning device which tells or warns the rider and near-by people when the switch of the electric motor is on and the scooter is ready to run.

The primary object of the invention is to provide a power source unit for an electromotive scooter which supplies power of nominal value of 48V to the electric motor that requires high voltage to exert high driving performance and also supplies power of nominal value of 12V via an auxiliary power source to the other electric devices in such a manner that even in a case of large fluctuation of voltage in the main power source, a stable power is assured for said electric devices, a control unit, for example, making it possible to employ as these devices those products for common use on the market.

The electric equipment on an electromotive scooter can be generally divided into three categories: the driving unit (electric motor), the control unit and the lighting devices. In the conventional scooters, it is a general practice to supply for these units or devices power of the same voltage from a common power source; no auxiliary power source is provided and all the units and devices are directly connected to storage batteries mounted in a place. One of the results thereof is that electromotive scooters are very poor in the driving performance compared with usual scooters equipped with internal combustion engines. One of the causes of it comes from the restriction on power source units. As stated above, all the devices and units on a conventional scooter have a common power source and, since most of the parts of the lighting devices on the usual market such as lamps and relays are manufactured for nominal voltage of 12V or 24V, adoption of these parts necessitates restriction of voltage of the power source to 12V or 24V. This results in a restriction of the output power of the driving unit (electric motor) itself and an inferior driving performance compared with the internal combustion engine scooters and has prevented electromotive scooters from coming into a wide use. On the other hand, in contrast to in-yard electromotive vehicles such as forklifts and golf carts which also use storage batteries as power source, electromotive scooters have a characteristic that a high rate discharge is required and has a large fluctuation in voltage of the power source; when the storage batteries are near exhaustion or a big current is discharged for acceleration or hill-climbing, the voltage drops greatly. This voltage drop has been a source of many troubles such as a decrease of illumination of lighting devices and, in case of an extreme drop, a malfunction of the control unit and hence a deteriorated action of tile driving unit.

The second object of the invention is to prevent accidents peculiar to the electromotive scooters, or in other words, to provide a warning device which, by means of a pilot lamp that gives a visual signal and a warning sound that gives an acoustic signal as an equivalence of the sensation of idling of internal combustion engines, tells or warns the rider or nearby people when the switch for the electric motor is on and the vehicle is ready to run, and thereby assure safety and prevent the vehicle from being left in an active condition.

The conventional internal combustion engine scooter comes into a ready-to-run condition as the engine is started, and even in halted condition, keeps what is called the idling condition in which the inner combustion engine rotates at a low revolution; therefore the rider or nearby people can clearly know through touch and sound of vibration from the engine that the vehicle is active. The electromotive scooter, however, does not have an idling condition like the internal combustion engine scooter. The motor makes rather a soft working sound and causes little vibration and further is in a completely stopped and still condition when the vehicle is not running. It is, therefore, difficult for the rider or nearby people to tell through senses if the scooter is in a condition ready to run or not. If, therefore, the throttle of an electromotive scooter is operated carelessly out of a habit with an internal combustion engine scooter, it may give rise to an accident through an abrupt starting. To avoid such an accident, a safety system wherein a switch built in the seat allows the motor to be started only when the rider is on the seat has been developed and put into practice. It is pointed out, however, that this safety measure has such drawbacks that the difference in sitting positions from rider to rider due to, for example, difference of size of their bodies may cause inaction of the motor or that lifting of the body weight above the seat by the rider while riding may cause dangerous sudden stops of the vehicle or intermittent loss of driving force.

OUTLINE OF THE INVENTION

The power source unit of the invention consists of a main power source which supplies a high voltage driving power to a driving unit (electric motor) and an auxiliary power source which generates stably a low voltage power by regulating the voltage of power from said main power source and thereby supplies said stable low-voltage power to lighting devices and a control unit.

To say more specifically, the main power source consists of a set of batteries of nominal total voltage of 48V, and the auxiliary power source is a DC-DC switching regulator which generates power of nominal voltage of 12V stably. The lighting devices, the control unit and other auxiliary devices that operate with power of nominal voltage of 12V are supplied with power by said DC-DC switching regulator.

The warning device of the electromotive scooter according to the invention comprises a power source indicator which displays visually the drivability status;

a seat load sensor which detects if the driver is on the seat; and a warning sound generator which warns by sound when the driver is not in the driving position while the scooter is in a drivable condition.

To say more specifically, the power source indicator is a pilot lamp, and the seat load sensor is a switch mechanism provided in the seat hinge portion supporting the seat which detects the seat load of the rider through on-off action. At the seat hinge mentioned above, a spring is provided to restrain the vertical freedom of motion.

Of the power source unit of the electromotive scooter according to the invention, the main power source of high voltage supplies power of nominal voltage of 48V to the driving unit for exertion of an adequate driving performance, whereas the auxiliary power source supplies power of nominal voltage of 12V stably to the lighting devices, the control unit, and others without being influenced by any fluctuation of voltage in the main power source, which permits the lighting devices to maintain adequate brightness and the control unit to work stably. Especially, even if the voltage of the main power source drops under the maximum level at which the electric motor can exert sufficient driving force, power is still supplied to the lighting devices and others stably and thereby adequate brightness of the lamps and prevention of runaway accidents are achieved. Moreover, ordinary parts on the market can be utilized for the units and devices except the driving unit, the merit coming from the fact that a power of nominal voltage of 12V is supplied to them.

The electromotive scooter according to the invention, therefore realizes a driving performance comparable to the internal combustion engine scooters and will contribute to wide use of electromotive scooters. Moreover the electromotive scooter according to the invention is advantageous in that ordinary parts for nominal voltage of 12V on the market can be utilized to simplify manufacturing processes and reduce costs. Regardless of fluctuation of voltage of the main power source, power is still supplied to the lighting devices and others stably and thereby adequate brightness of the lamps and prevention of runaway accidents are achieved.

On the electromotive scooter according to the invention, as a driver switches on the start key and the scooter comes to the ready-to-drive condition, the pilot lamp on the instrument panel is lighted and tells: or warns visually the driver and nearby people that the scooter (the electric motor) will be put into running motion in immediate response to the operation of the throttle by the rider. But, if the rider is not in the proper riding position, not sitting on the seat, for example, it is detected by the switch in the seat load sensor and if said start key is switched on in this condition, a buzzer sound is emitted to warn the rider and urge him to get in the riding position or to switch off the start key. The acoustical warning by the buzzer is very effective to attract attention when the rider and nearby people are looking in arbitrary ways. As the rider is sitting on the seat in the proper riding position, the normally closed warning circuit is switched off and the pilot lamp on the instrument panel visually warns or tells that the scooter is ready to run. In this situation, the visual warning is effective because the rider is in the position to inevitably see the instrument panel, while the buzzer is disabled not to disturb the rider or make unnecessary noise. The sound volume of the buzzer is adjusted to the level necessary and adequate to arouse attention.

Said seat load sensor consists of a switch and a vertical spring built into the seat hinge. The construction being such that the load sensor portion functions both as the seat hinge and the sensor, the difference of position of the rider on the seat have little influence on the working of the load sensor (almost no malfunction occurs), and the warning device functions stably. Moreover, vanishing of seat load while riding only causes the buzzer to beep but does not give rise to sudden loss of driving force which can be a danger for the rider. The seat hinge, which also works for detection of seat load, has not only its proper freedom of motion for turning but also has the freedom for vertical motion, which is restrained always by the spring; hence, there is no backlash at the hinge when the seat is opened or closed, while the hinge functions smoothly for turning.

The driving operation warning device according to the invention gives an acoustic warning by a buzzer which is very effective to attract attention of the rider out of the riding position and nearby people who may be looking in arbitrary ways. On the other hand, the power source indicator (the pilot lamp) on the instrument panel tells or warns the rider who is in the riding position in an effective visual way. In this condition, the buzzer is disabled and neither disturbs the rider nor makes unnecessary noise. Further, the driving operation warning device works only to give a warning or a notice and does not cause a loss of driving force, which contributes to maintenance of positive driving of the motor and to the safety of the rider. The existence of the seat load, that is, if the rider is sitting on the seat, is detected by the seat load sensor(switch) which is little influenced by the difference of the sitting position of the rider, assuring a stable functioning of the operation warning device. The seat hinge, which also works for detection of seat load, has not only its proper freedom of motion for turning but also has the freedom for vertical motion, which is restrained always by the spring; hence, there is no backlash at the hinge when the seat is opened or closed, while the hinge functions smoothly for turning.

The scope of the broader applicability of the invention will be apparent from the following detailed description of the invention using an embodiment. Various variations and modifications will be apparent from the description below for those skilled in the art, and it should be understood that the following is but a description of one preferred embodiment.

BRIEF DESCRIPTION OF THE DRAWINGS

The description herein of an embodiment of the invention is made with reference to the accompanying drawings wherein.

DESCRIPTION OF THE PREFERRED EMBODIMENT

Figure 1:
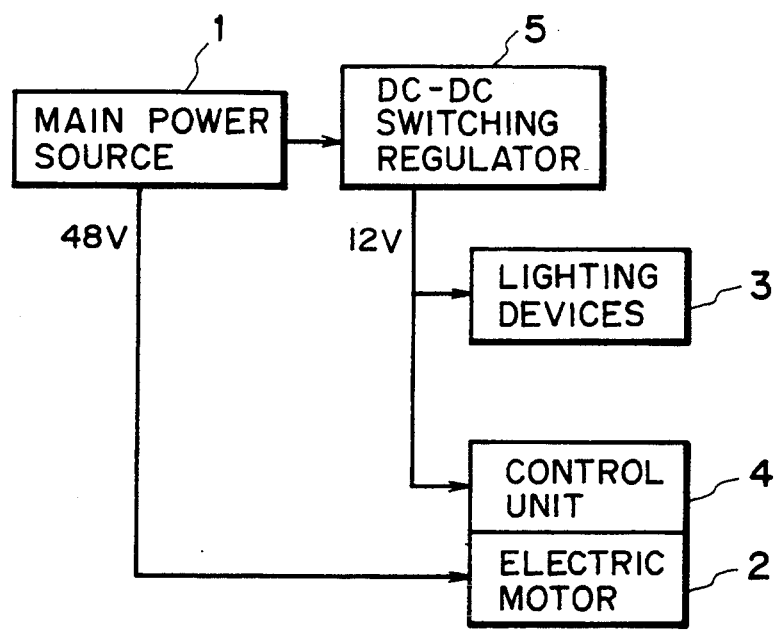
FIG. 1 is a schematic block diagram showing connection of the electric units and devices of an electromotive scooter according to the invention.
Figure 2:
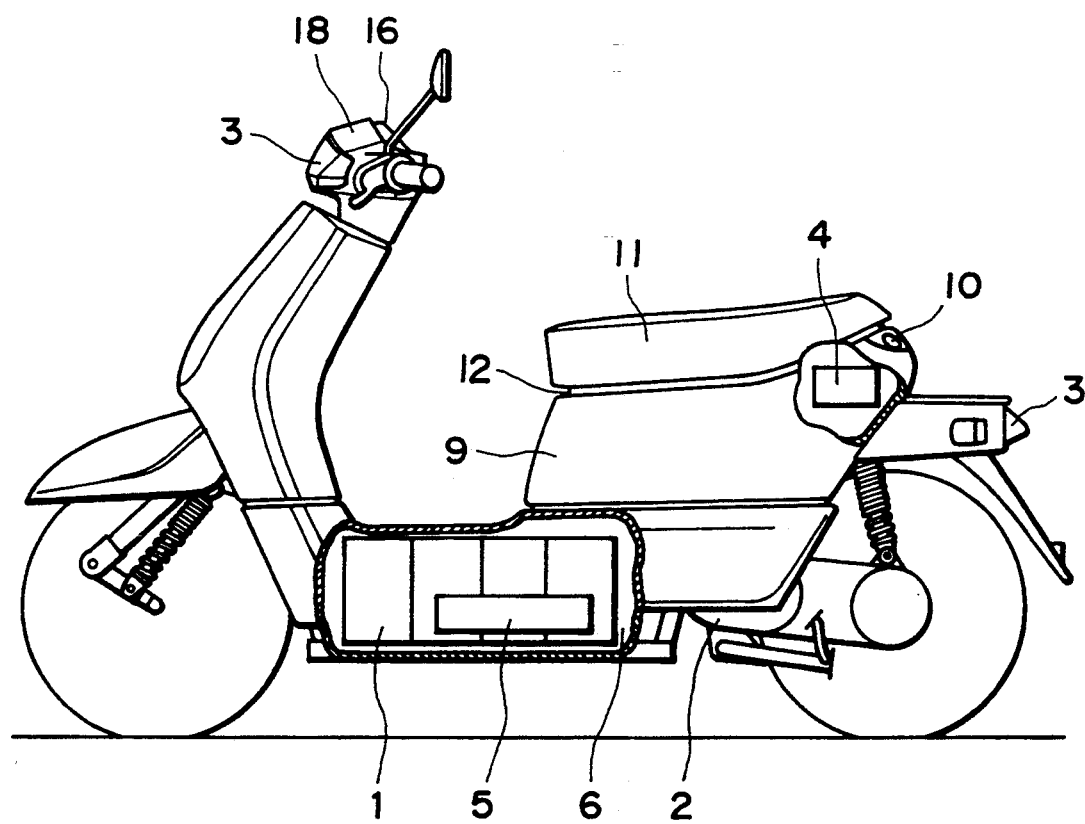
FIG. 2 is a side elevation, partly broken away view of the electromotive scooter.

FIG. 1 is a schematic block diagram showing the connection of electric units and devices of an electromotive scooter using the power source units of the invention, and FIG. 2 is a side elevational view of said electromotive scooter. The main power source 1 has nominal voltage of 48V and consists of four batteries of nominal voltage of 12V connected in series and mounted in a battery room 6 provided in the lower part of the scooter frame. The main power source 1 is connected directly to the electric motor 2 by means of cables. For the electric motor 2 is used a motor specified for nominal voltage of 48V. This electromotive scooter, therefore, has an excellent driving performance comparable to that of a scooter having an internal combustion engine owing to the big driving force of said electric motor.

The DC-DC switching regulator 5, which works as an auxiliary power source, is provided adjacent the main power source 1 in the battery room 6. Said DC-DC switching regulator 5 gets nominal 48V power from the main power source 1, reduces and regulates it to a stable power of nominal 12V, and supplies it to the auxiliary devices such as the control unit 4 and lighting devices 5. Since the DC-DC switching regulator 5 supplies a stable nominal 12V power even if the main power source 1 undergoes large voltage fluctuation, the lighting devices 3 can keep adequate brightness and the control unit 4 can operate stably. As the DC-DC switching regulator 5 can be employed, for example, a chopper-type switching regulator. This type regulator can operate normally even when the voltage of the power from the main power source 1 drops to 25V which is far below the allowable voltage value of 38V for the driving unit 2. This enables the maintenance of adequate brightness of the lighting devices 3 and prevention of runaway accidents through stable functioning of the control unit 4. For the DC-DC switching regulator 5 can be used not only said chopper-type, but also voltage regulator circuits such as an insulated-type switching regulator or a dropper-type which regulates voltage drops.

The auxiliary devices, that is, the control unit 4 and the lighting devices 3 which are supplied with the constant voltage power from the main power source 1, are all those specified for use with nominal 12V and hence can be selected efficiently from a great variety of products on the market manufactured in large quantities for general automotive use. The control unit 4 controls mainly the driving unit (electric motor) 2.

Figure 3:
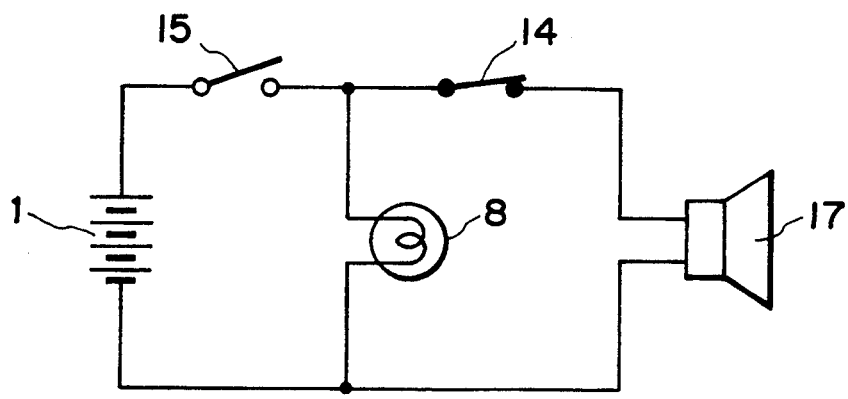
FIG. 3 is a schematic diagram showing a circuit of a driving operation warning device.
Figure 4:
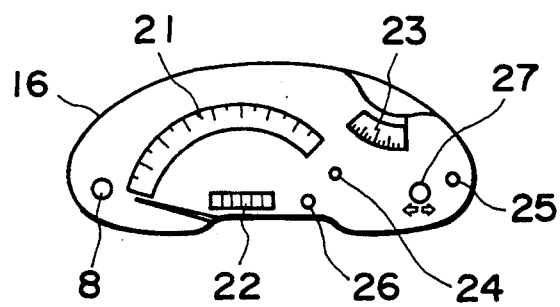
FIG. 4 is a plan view showing the instrument panel.

The operation warning device shown in FIG. 3 consists of the start-key switch 15 for the electromotive scooter, the pilot lamp 8 provided on the instrument panel 16 as a power source indicator, the buzzer 17 which is a warning sound generator provided in the front cowl 18 of the steering unit and the switch 14 which is attached to the seat hinge 12 of the seat 11 and works as a seat load sensor. The seat 11 also play the role of a cover of the luggage box 9 for accommodating a helmet, etc.

The start-key switch 15 is for on-off operation of the main power source 1 of the electric motor 2; the electromotive scooter is brought into the ready-to-run condition through turning on this switch 15. The pilot lamp 8 is always lighted when the start-key switch is on (the scooter is ready to run) and tells or warns the rider visually that the motor is ready to go into running motion in direct response to throttle operation (accelerator operation). The instrument panel 16 is provided on the upper surface of the steering unit for the sake of better visibility and includes, besides the pilot lamp 8, a speedometer 21, an odometer 22, a battery indicator 23, a speed warning light 24, an temperature indicator 25, a charge indicator 26, and turning signal indicators 27.

The buzzer 17 is to give acoustical warnings to the rider and nearby people and is provided in the front cowl 18 of the steering unit. But it isn't shown in a concrete drawing. The sound volume of the buzzer 17 is set to the level necessary and adequate to arouse attention of the rider.

Figure 5:
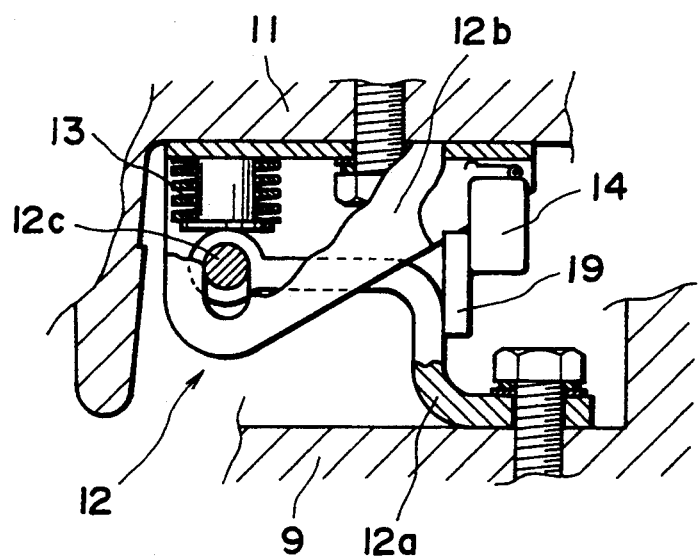
FIG. 5 is a sectional view showing the details of the seat hinge portion of the seat.

The switch 14 which constitutes the seat load sensor, is a kind of micro switch and tells the existence of a seat load through on-off action. As shown in FIG. 5, the switch 14 is attached to the seat hinge 12 of the seat 11. The seat hinge 12 is provided under the seat 11 and enables the seat 11 to be raised up or turned down for opening and closing of the luggage box 9. The locking device 10 locks the seat 11 at its closed position. The seat hinge 12 consists of a fixed hinge piece 12a on the side of the luggage box 9 and a movable hinge piece 12b on the side of the seat 11, which are connected one another by means of a horizontal hinge shaft 12c. This seat hinge 12 has not only its proper freedom of motion for rotation but also a freedom for vertical motion for the purpose of on-off operation of the switch 14 fixed to said hinge piece 12a through an attachment piece 19. Said freedom of vertical motion is, however, restrained by a vertical spring 13 mounted there. As the rider sits on the seat 11 and takes a driving position, the forward portion of the seat 11 sinks and the switch 14 is turned on. The construction being as stated above, the switch 14 is actuated without fail when the rider sits on the seat 11 or lifts his weight from the seat 11 regardless of the position on the seat 11 where the rider sits.

In the construction described above, as the key switch 15 is turned on, the pilot lamp 8 is lighted and the electromotive scooter comes into the ready-to-run condition. Then, if the rider gets into the riding position, the switch 14, that is, the seat load sensor detects it and is turned off. But, if the switch 14 remains in the on-condition, that is, the rider is not in the riding position after the key switch 15 is turned on, then the buzzer 17 gives out a warning and urges the rider either to sit on the seat or to turn off the key switch 15.

I claim:
1. An electromotive scooter comprising:
   a drive wheel,
   an electric drive motor coupled drivingly to said drive wheel,
   a main DC power source providing DC electric power at a first voltage for supply to the electric drive motor,
   a control unit that employs DC electric power at a second voltage, which is substantially less than the first voltage, for controlling the electric drive motor,
   lighting devices that employ DC electric power at said second voltage, and
   a DC-DC switching regulator connected to the main DC power source and providing stable DC electric power at said second voltage, for supply to the lighting devices and the control unit, whereby upon fluctuation in the voltage supplied by the main DC power source due to variation in load applied to the motor when the scooter is in use, the voltage of electric power supplied by the DC-DC switching regulator to the lighting devices and the control unit remains stable.

2. A scooter according to claim 1, wherein the main power source comprises a set of storage batteries for providing DC electric power at a nominal voltage of 48 volts and the DC-DC switching regulator provides DC electric power at 12 volts.

3. A scooter according to claim 1, further comprising:
   a rider's seat,
   a seat load sensor for detecting whether a rider is on the rider's seat,
   a power source indicator that provides a visual indication to the rider seated on the rider's seat of whether the scooter is in a ready-to-drive condition, and a warning sound generator that provides an acoustical warning when the scooter is in the ready-to-drive condition and there is no rider on the rider's seat.

4. A scooter according to claim 3, wherein the power source indicator is a pilot lamp that is illuminated when the scooter is in the ready-to-drive condition, and the seat load sensor is a switch that is conductive when a rider is seated on the rider's seat and is non-conductive when there is no rider seated on the rider's seat.

5. A scooter according to claim 4, wherein the seat is hinged to a body part of the scooter and the switch is provided at the location of the hinge.

6. A scooter according to claim 5, wherein the hinge allows limited vertical movement of the seat, and the scooter comprises a spring for restraining such movement of the seat.

* * * * *